United States Patent [19]

Brunner et al.

[11] 4,388,127
[45] Jun. 14, 1983

[54] METHOD FOR WRAPPING THREE-DIMENSIONALLY CURVED CONDUCTORS

[75] Inventors: Karl Brunner, Schwabach; Hans Barking, Dinslaken; Günter Didschies, Nürnberg-Boxdorf, all of Fed. Rep. of Germany

[73] Assignee: Siemens Aktiengesellschaft, Munich, Fed. Rep. of Germany

[21] Appl. No.: 272,475

[22] Filed: Jun. 11, 1981

[30] Foreign Application Priority Data

Jun. 13, 1980 [DE] Fed. Rep. of Germany ....... 3022303

[51] Int. Cl.³ ............................................ H01B 13/08
[52] U.S. Cl. ........................................ 156/53; 29/605; 156/56; 156/185; 156/189; 156/195; 156/212; 156/428; 156/431; 242/7.03; 242/7.06; 242/7.08

[58] Field of Search .................... 29/33 L, 240, 564.5, 29/596, 598, 605, 735, 819, 820; 57/10; 156/53, 172, 173, 175, 185, 189, 195, 212, 425, 428, 430, 431, 432, 56, 117, 397; 242/7.01, 7.02, 7.03, 7.06, 7.08; 174/108, 109; 138/129, 131, 150, 154

[56] References Cited

U.S. PATENT DOCUMENTS

| 2,666,283 | 1/1954 | Dearborn | 242/7.21 X |
| 3,616,061 | 10/1971 | Carter | 156/431 |
| 3,940,073 | 2/1976 | Haeusler et al. | 242/7.08 |
| 4,046,176 | 9/1977 | Le Gall | 156/432 X |
| 4,166,000 | 8/1979 | Lawson | 156/172 X |

*Primary Examiner*—Robert A. Dawson
*Attorney, Agent, or Firm*—Kenyon & Kenyon

[57] ABSTRACT

A system for applying insulating tape to a three-dimensionally curved conductor, particularly of the type used in high voltage applications. A wrapping ring having an axis of rotation is oriented with respect to the conductor such that the axis of rotation is always placed on the spinning point of the insulating tape, the spinning point being at the location where the tape tangentially contacts the conductor during wrapping. Such an orientation of the wrapping ring avoids the formation of pockets at the curved places of the conductor.

3 Claims, 3 Drawing Figures

METHOD FOR WRAPPING THREE-DIMENSIONALLY CURVED CONDUCTORS

BACKGROUND OF THE INVENTION

This invention relates generally to systems for wrapping curved conductors, and more particularly, to a method for wrapping curved conductors in high-voltage motors, generators, and transformers, wherein a wrapping ring which is provided with at least one tiltable roll of insulating tape is guided along the conductor by a wrapping device which permits the wrapping ring to be moved in any of six directions.

Prior art arrangements for wrapping high-voltage conductors which are curved in three dimensions are known to be provided with a wrapping ring having one or mre tiltable supply rolls of insulating materials such as cellulose paper, mica tape, and the like. In such systems, the wrapping ring is guided along the curved conductor by the conductor itself. Alternatively, guide templates are used, or the curve to be followed along the conductor is stored in a memory which controls an electrical guidance mechanism. Thus, the rotating wrapping ring may be moved in any of six directions, so as to be translatable in three axes, and can rotate around the same axes.

Notwithstanding the sophistication of such known wrapping systems, there is a need for a system which can wrap curved sections of a conductor, without creating pockets in the wrapped insulating tape. Such pockets substantially reduce the mechanical and insulating strengths of the resulting insulation.

It is, therefore, an object of this invention to provide an improved wrapping system for curved conductors which avoids the undesirable formation of pockets between the insulating tape and the conductor.

SUMMARY OF THE INVENTION

The foregoing and other objects are achieved by this invention which provides that the axis of rotation of the wrapping ring is arranged so as to be located at the spinning point of the insulating tape, said spinning point being arranged at the location where the insulating tape tangentially meets the conductor.

In one embodiment of the invention, the wrapping ring is advantageously displaced by a translation such that it can be tilted about the respective spinning point. This permits the wrapping ring to be moved in two wrapping directions about the respective spinning point. Such tilting of the wrapping ring is achieved by providing a positioning spindle which operates with respect to an axis of rotation of the wrapping ring.

BRIEF DESCRIPTION OF THE DRAWINGS

Comprehension of the invention is facilitated by reading the following detailed description in conjunction with the annexed drawings, in which.

DETAILED DESCRIPTION

Figure 1:
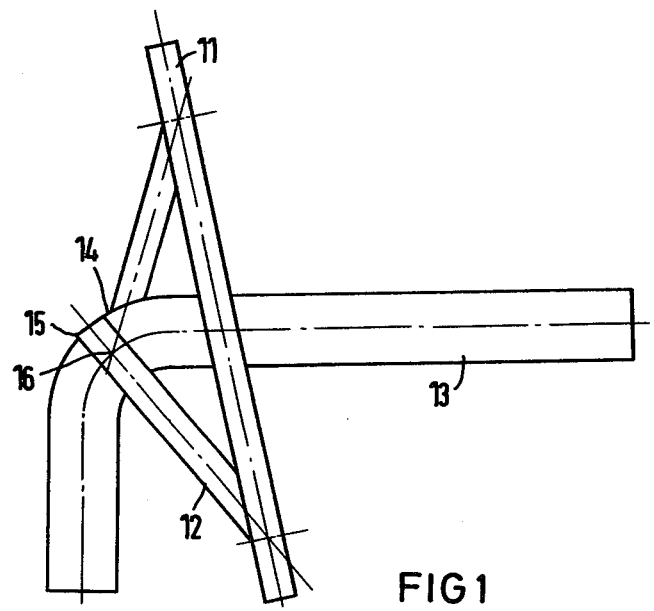
FIG. 1 is a schematic representation of a prior art wrapping arrangement which produces pockets in the insulating material.

FIG. 1 schematically depicts a prior art insulation wrapping arrangement, and illustrates the manner in which undesirable pockets 15 are formed at a curve 14 of a conductor 13. A wrapping ring 11 having an insulation tape 12 is rotated about conductor 13 so as to apply the insulating tape to the conductor. An undesirable pocket 15 is produced at curve 14 of conductor 13 because insulating tape 12 cannot be wrapped closely at this point. Such pockets between the layers of insulating tape have a substantial adverse affect upon the electric insulating strength of the insulating tape, and its mechanical strength. Such undesirable pockets are formed as a result of the position of the axis of rotation of wrapping ring 11 with respect to a spinning point 16 which is the location at which insulating tape 12 tangentially meets the conductor as the insulating tape is being applied.

Figure 2:
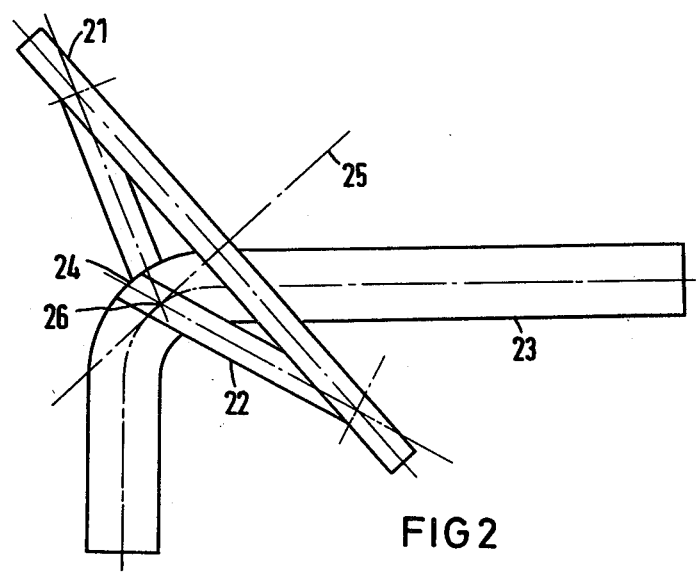
FIG. 2 is a schematic representation of a wrapping arrangement which operates in accordance with the principles of the invention.

FIG. 2 illustrates the inventive system whereby the formation of pockets in the wrapping of the curved conductor is avoided. In this embodiment of the invention, a wrapping ring 21 having an insulating tape 22 is rotated about a curved conductor 23 in such a manner that an axis of rotation 25 of wrapping ring 21 which is always located at a spinning point 26 of the insulating tape. Such coincidence between axis of rotation 25 and spinning point 26 prevents the formation of pockets of insulating tape 22 at curvature 24 of the conductor.

Figure 3:
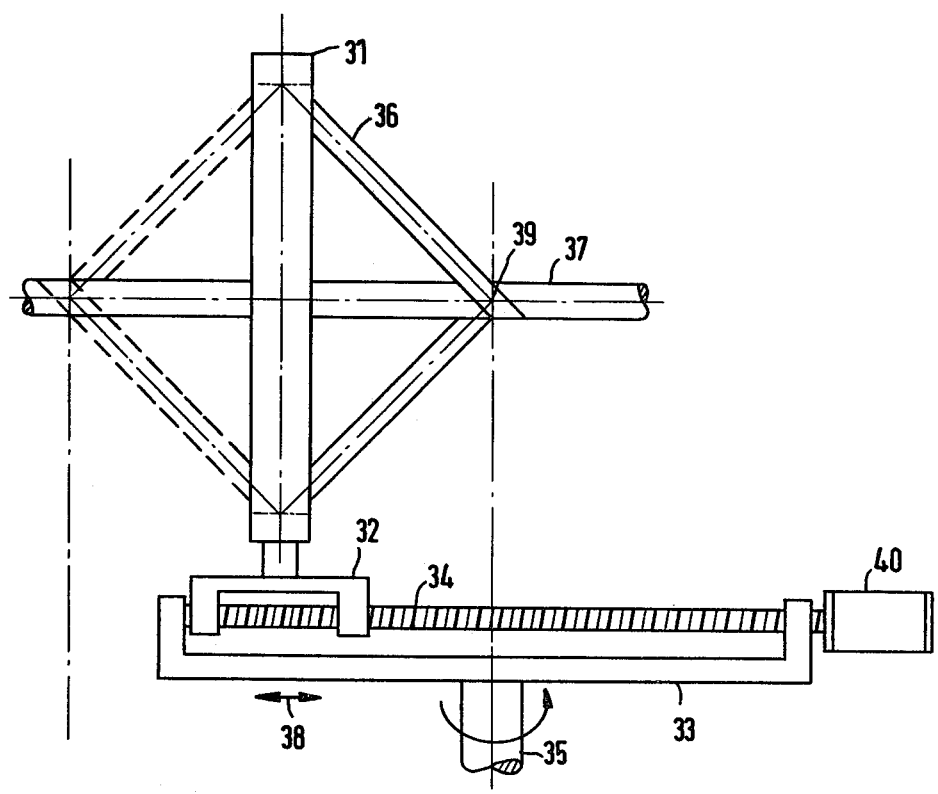
FIG. 3 is a schematic representation of an arrangement for tilting the wrapping ring in two wrapping directions.

FIG. 3 illustrates an arrangement by which a wrapping ring 31 is displaceable by translation and rotation, by means of a positioning device 33. Wrapping ring 31 is affixed perpendicularly to a support 32 of positioning device 33. Support 32 is translatable along the length of a spindle 34, which is threadedly engaged therewith, and rotatable by a motor 40. Thus, the rotation of motor 40 causes support 32 to move in the direction of arrow 38. Positioning device 33 is rotatably arranged on a shaft 35. Support 32 is translated on spindle 34 and rotated on shaft 35 so that an insulating tape 36 is wrapped around a conductor 37 is such a manner that the central axis of wrapping ring 31 is always located at a spinning point 39 of tape 36. This arrangement permits wrapping ring 31 to be moved about the spinning point in two wrapping directions.

Although the inventive concept herein has been described in terms of specific embodiments and applications, other embodiments and applications, in light of this teaching, would be obvious to persons skilled in the art. Accordingly, the drawings and descriptions in this disclosure are illustrative of the applications of the invention, and should be construed to limit the scope thereof.

What is claimed is:

1. A method for wrapping a three-dimensionally curved conductor with insulating tape by using a wrapping device having a wrapping ring provided with at least one tiltable supply roll of tape, the tape being guided along a curved conductor, the wrapping ring having freedom of movement in six directions, and an axis of rotation, the method comprising the step of moving the wrapping ring so that its axis of rotation is always located at a spinning point of the tape, said spinning point of the tape being located where the tape tangentially contacts the conductor.

2. The method of claim 1 wherein there is further provided the step of displacing by translation the wrapping ring so that the wrapping ring can be tilted about the respective spinning point.

3. The method of claim 2 wherein there is further provided the step of displacing by translation the wrapping ring with respect to the axis of rotation by operating a positioning spindle.

* * * * *